April 18, 1967  R. D. BEALE  3,314,651
SEALING DEVICE
Filed March 18, 1965
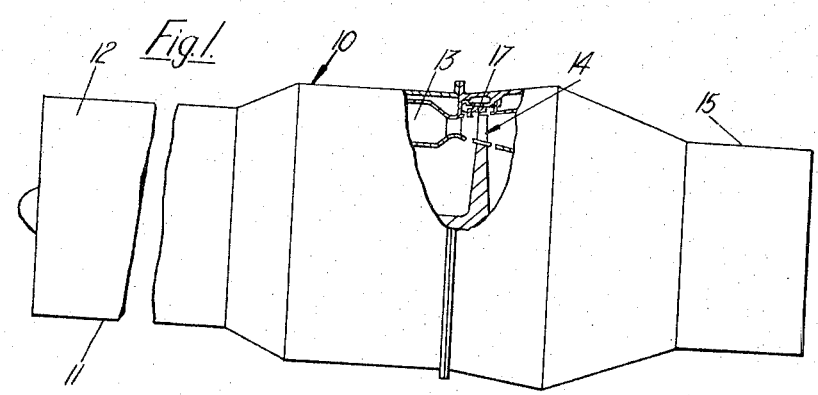
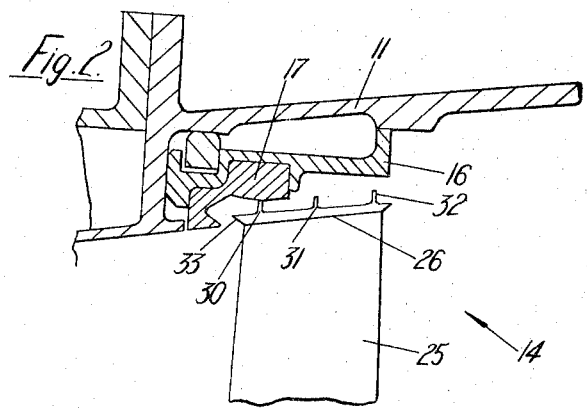
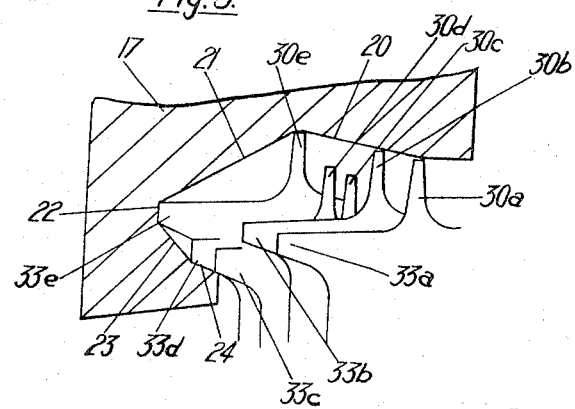
Inventor
Richard Derby Beale
By
Cushman, Darby & Cushman
Attorneys

United States Patent Office 3,314,651
Patented Apr. 18, 1967

3,314,651
SEALING DEVICE
Richard D. Beale, Derby, England, assignor to Rolls-Royce Limited, Derby, England, a company of Great Britain
Filed Mar. 18, 1965, Ser. No. 440,714
Claims priority, application Great Britain, Apr. 9, 1964, 14,801/64
3 Claims. (Cl. 253—77)

This invention concerns an axial flow rotor.

According to the present invention, there is provided an axial flow rotor, fixed structure within which the rotor is rotatably mounted, said fixed structure being provided with a plurality of surfaces which are inclined at acute angles to the axis of the rotor, a plurality of radially extending blades on the rotor, at least one radially extending sealing rib and at least one axially extending sealing rib on the radially outer end of each blade, each said sealing rib being adapted to make a seal with at least one said surface of said fixed structure, at least one of said sealing ribs on each blade being at all times in sealing contact with a respective surface of the fixed structure even when relative radial and axial movement has occurred between the blades and the fixed structure.

Each of the sealing ribs and the fixed structure are preferably made of materials such that each sealing rib can cut a path for itself in the respective surface.

The axially extending ribs preferably extend upstream of the rotor blades.

The rotor may be a turbine for a gas turbine engine.

The invention is illustrated, merely by way of example, in the accompanying drawings, in which:

FIGURE 1 is a diagrammatic view, partly in section, of a gas turbine engine provided with a rotor according to the present invention, FIGURE 2 as a broken-away sectional view on a larger scale of part of the structure shown in FIGURE 1, and FIGURE 3 is a broken-away sectional view on a yet larger scale of part of the structure shown in FIGURE 2, certain parts being shown in FIGURE 3 in a number of different positions.

In FIGURE 1 there is shown a gas turbine jet engine 10 adapted for use in aircraft propulsion, the engine 10 comprising an engine casing 11 within which there are mounted in flow series a compressor 12, combustion equipment 13 and a turbine 14, the turbine exhaust gases being directed to atmosphere through an exhaust duct 15.

An annular member 16 (see FIGURE 2) is mounted within the engine casing 11 and is provided on its radially inner side with an annular assembly of inserts 17.

Each of the inserts 17 (see FIGURE 3) is provided with substantially axial inclined surfaces 20, 21 and with substantially radial inclined surfaces 22, 23, 24. Each of the surfaces 20, 21, 23 and 24 is inclined at an acute angle to the axis of the turbine 14.

The turbine 14 has a plurality of rotor blades 25. Each of the rotor blades 25 has a shroud 26 which is formed with radially extending sealing ribs 30, 31, 32, and with an axially extending sealing rib 33.

When the engine 10 is not in operation, the sealing rib 30 is in the position indicated at 30a in FIGURE 3, in which it makes sealing contact with the downstream end of the axial inclined surface 20, whilst the axially extending sealing rib 33 is in the position indicated at 33a, where it is spaced from the radial inclined surfaces 22, 23, 24. In this position, the radially extending sealing rib 30 makes a seal with the axial inclined surface 20.

When the engine 10 is running at ground idling speed, the turbine 14 will expand radially with respect to the casing 11, whilst the latter will expand axially. The radially extending sealing rib 30 will thus, in effect, move upstream along the axial inclined surface 20 so as to adopt the position shown at 30b, in which it makes sealing contact with the axial inclined surface 20. At this time, the axially extending sealing rib 33 will be disposed at the position shown at 33b, in which it will be well spaced from any of the radial inclined surfaces 22 to 24.

When the engine 10 is being operated at cruise speeds, the engine casing 11 will expand both radially and axially with respect to the turbine 14, and the radially extending sealing rib 30 will then be disposed in the position indicated at 30c, where it will be well spaced from the axial inclined surface 20. At this time, however, the axial inclined surface 33 will be disposed as shown at 33c in sealing contact with the radial inclined surface 24.

When the engine 10 is operated at take-off speed, the radially extending sealing rib 30 and the axially extending sealing rib 33 are disposed in the positions indicated at 30d, 33d respectively. In these positions, the radially extending sealing rib 30 is spaced away from the axial inclined surface 20, whilst the axially extending sealing rib 33 is disposed in sealing contact with the radial inclined surfaces 23, 24.

When the engine 10 is being run at speeds corresponding to rapid starting and slam acceleration, the radially extending sealing rib 30 will be disposed in the position indicated at 30e, where it makes sealing contact with the axial inclined surfaces 20, 21. Moreover, at this time the axially extending sealing rib 33 will be disposed at the position indicated at 33e, in which it contacts the radial inclined surface 22.

It will thus be appreciated that in all operative conditions, one or both of the sealing ribs 30, 33, will make a seal with one or more of the surfaces on the inserts 17.

The blades 25 are made of a nickel-based alloy, such as that sold under the Registered Trademark "Nimonic," whilst the inserts 17 are made of cast iron, or of other material such as to permit the sealing ribs 30, 33, to cut paths for themselves in the surfaces of the inserts 17 if this should be necessary on relative expansion and contraction of the parts.

I claim:

1. An axial flow rotor, fixed structure within which the rotor is rotatably mounted, said fixed structure being provided with a plurality of surfaces which are inclined at acute angles to the axis of the rotor, a plurality of radially extending blades on the rotor, at least one radially extending sealing rib and at least one axially extending sealing rib on the radially outer end of each blade, each said sealing rib being adapted to make a seal with at least one of said surfaces of said fixed structure, at least one of said sealing ribs on each blade being at all times in sealing contact with a respective surface of the fixed structure even when relative radial and axial movement has occurred between the blades and the fixed structure.

2. An axial flow rotor, fixed structure within which the rotor is rotatably mounted, said fixed structure being provided with a plurality of surfaces which are inclined at acute angles to the axis of the rotor, a plurality of radially extending blades on the rotor, at least one radially extending sealing rib and at least one axially extending sealing rib on the radially outer end of each blade, each said sealing rib being adapted to make a seal with at least one of said surfaces of said fixed structure and each of the sealing ribs and the fixed structure being made of materials such that each sealing rib can cut a path for itself in the respective surface, at least one of said sealing ribs on each blade being at all times in sealing contact with a respective surface of the fixed structure even when relative radial and axial movement has occurred between the blades and fixed structure.

3. An axial flow rotor, fixed structure within which the rotor is rotatably mounted, said fixed structure being provided with a plurality of surfaces which are inclined at acute angles to the axis of the rotor a plurality of radially extending blades on the rotor, at least one radially extending sealing rib and at least one axially upstream extending sealing rib on the radially outer end of each blade, each said sealing rib being adapted to make a seal with at least one of said surfaces of said fixed structure, at least one of said sealing ribs on each blade being at all times in sealing contact with a respective surface of the fixed structure even when relative radial and axial movement has occurred between the blades and fixed structure.

References Cited by the Examiner
UNITED STATES PATENTS 1,999,739 4/1935 Rasmussen _____ 253—77
3,092,393 6/1963 Morley et al. _____ 253—77 X

FOREIGN PATENTS 560,545 7/1923 France.
485,833 11/1929 Germany.
557,490 11/1943 Great Britain.
563,727 8/1944 Great Britain.
804,922 11/1958 Great Britain.
140,809 3/1961 Russia.

MARTIN P. SCHWADRON, *Primary Examiner.*

EVERETT A. POWELL, Jr., *Examiner.*